June 12, 1956     J. H. VAN ALSBURG     2,750,157
CATTLE GUARD

Filed Feb. 28, 1952     2 Sheets-Sheet 1

Inventor
Jerold H. VanAlsburg
By
Attorney

June 12, 1956  J. H. VAN ALSBURG  2,750,157
CATTLE GUARD
Filed Feb. 28, 1952  2 Sheets-Sheet 2
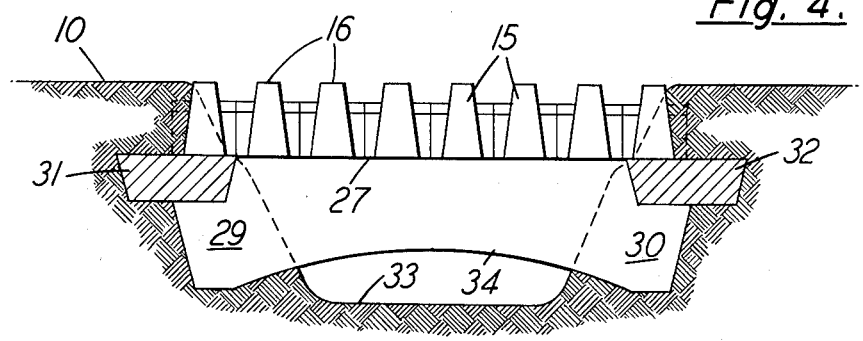
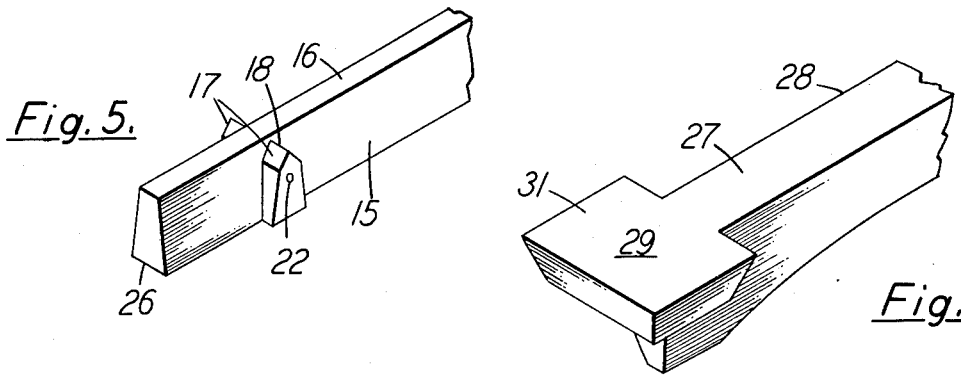
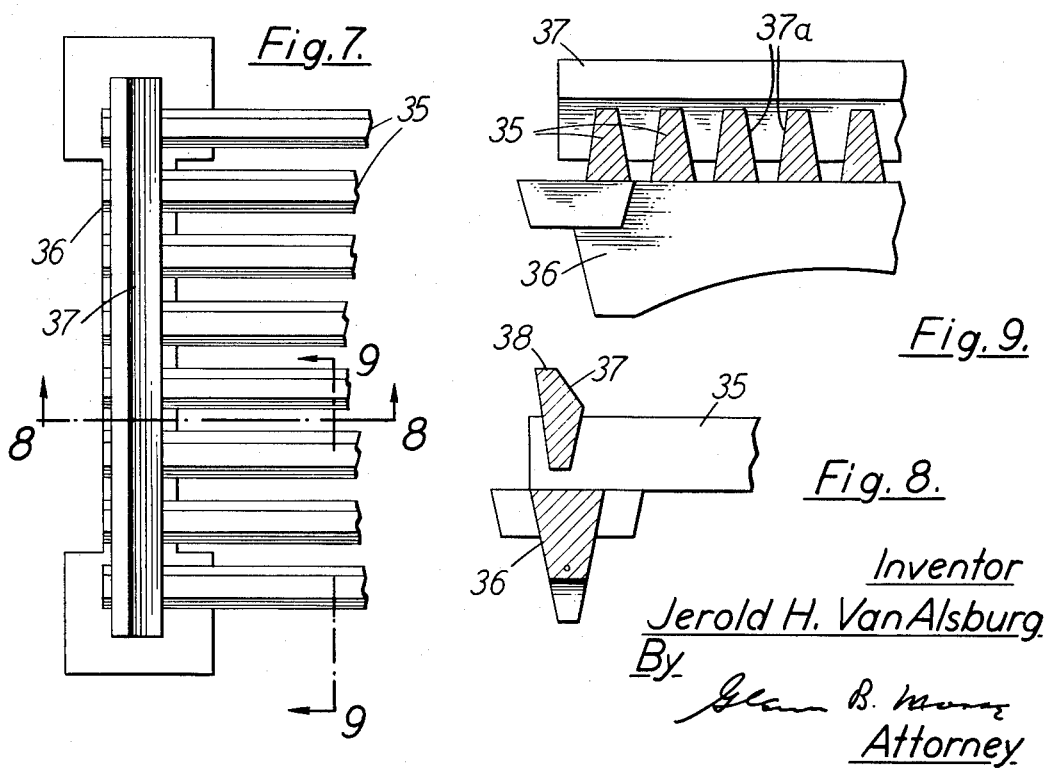
Inventor
Jerold H. Van Alsburg
By
Attorney

United States Patent Office 2,750,157
Patented June 12, 1956

2,750,157
CATTLE GUARD
Jerold H. Van Alsburg, Santa Fe, N. Mex.

Application February 28, 1952, Serial No. 273,911

1 Claim. (Cl. 256—17)

The present invention relates to the construction of a cattle guard. This type of device is used at the intersection of a road and a fence, and removes the necessity of using a gate at this point to keep cattle from wandering out from the fenced area. In principle, a cattle guard provides a surface in the roadway over which cattle will not walk. It is the usual practice to construct these devices as a series of spaced rails arranged generally parallel to the direction of the fence, the tops of the rails being narrow enough so as not to afford sufficient footing for the animals. This construction establishes a grill work that is conventionally laid upon suitable footing members over a pit having sufficient depth to provide a space to accumulate earth and foreign material which would otherwise lodge between the spaced rails so as to progressively build up to a flat surface over which the cattle could walk. The present invention is an improvement in the construction of these devices and provides for a series of components that may be formed of cast material such as concrete, and which are capable of being united into a solid assembly by a very simple operation. The formation of the elements of the grill work is such that the spacing, shape, and contour of the device is automatically established by merely laying them in place and connecting them with a suitable series of tie bolts.

This invention also provides a footing member to be used in conjunction with the grill work which combines the function of providing a bearing surface against the ground with the added function of acting as a cantilever beam for spanning the refuse pit disposed under the grill work. The construction of the beam (together with its footing portion) is such that the relative position of the center of gravity and the footing portions give a natural tendency for the unit to maintain its desired attitude.

The several features of the present invention will be analyzed in detail through a discussion of the particular embodiments illustrated in the accompanying drawings. In these drawings, Figure 1 presents a schematic diagram illustrating the place where the device is used.

Figure 2 presents plan view of an assembled cattle guard without reference to the earth and roadway with which it is associated.

Figure 3 presents a section on the plane 3—3 of Figure 2.

Figure 4 presents an end view of the device as it would appear on the plane 4—4 of Figure 2, but showing the installation of the unit in the ground.

Figure 5 shows a perspective view of a portion of one of the grill work components.

Figure 6 shows a perspective view of the end of one of the footing beam members used for supporting the grill work.

Figure 7 shows a fragmentary plan view of a portion of the device constructed according to a modified form of the present invention.

Figure 8 is a view taken along the plane 8—8 of Figure 7.

Figure 9 is a section taken along the plane 9—9 of Figure 7.

Figure 1:
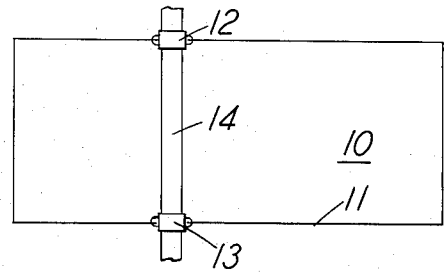
Figure 2:
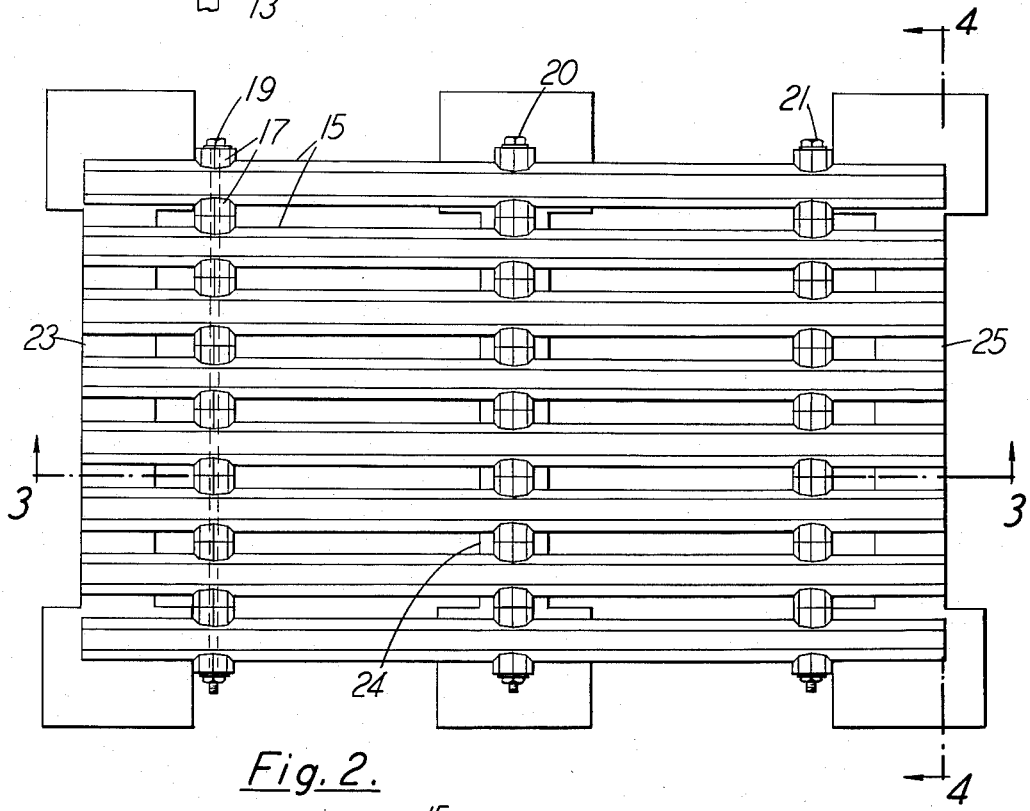
Figure 3:
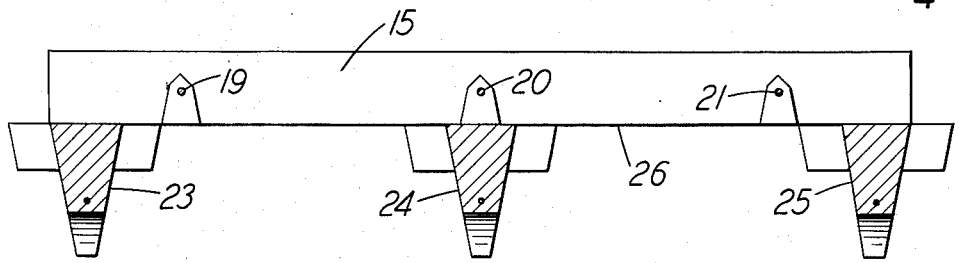

Referring to Figure 1, a range or pasture area is shown at 10. This area is surrounded by the fence 11, which is intersected at the points 12 and 13 by the road 14. In the event that the road 14 carries a large amount of traffic, it is a considerable burden to contend with the inconvenience of gates at the points 12 and 13. To run parallel strips of fence along either side of the road 14 between the points 12 and 13 presents added expense, particularly where large areas of land are involved. To avoid the necessity of either using the gates or the parallel roadside fencing, a device similar to that illustrated in Figure 2 is placed in position at the points 12 and 13. The grill work established is of such a nature that cattle will not walk over it; and the net result of the arrangement shown in Figure 1 will be to maintain the enclosure of the area 10, as far as retaining the cattle is concerned, without interfering with the passage of vehicles along the roadway 14.

Referring to Figure 2, a grill work is formed of a series of rails 15 arranged in a direction parallel to the fencing (transversely disposed with respect to the road). As indicated in Figure 5, each of these rails is formed preferably trapezoidal in cross section, with the top surface 16 narrow enough to prevent adequate footing for the animals retained in the enclosure. Preferably at several places along the length of the rails 15, a set of opposite projections 17 are provided. These projections have the primary purpose of spacing the rails 15 in the desired relationship. The tops of the projections 17 are preferably pointed as indicated at 18 to minimize the amount of horizontal surface available. It will also be noted that the pointed area 18 is displaced from the plane of the surface 16, the purpose of this arrangement being to prevent the establishment of a substantial supporting area merely through the intersection of two relatively narrow surfaces.

The grill work is bound together into a single unit by the transverse bolts 19, 20, and 21 which pass through the holes similar to that indicated at 22 in Figure 5. The holes 22 are formed when the material of the rail members 15 is cast. One very noticeable advantage of this type of construction is the ease in which a damaged element of the grill work may be replaced without the necessity of lifting the whole unit out of its position on the ground. It is only necessary to provide clearance for the withdrawal of the bolts 19, 20, and 21 in a sufficient amount to disengage the damaged member, and a new element may then be placed in position.

The grill unit formed as indicated above is supported by the transverse beams 23, 24, and 25. The construction of these beams is indicated in the perspective view shown in Figure 6. The bottom surfaces 26 of the rail members 15 rest upon the top surface 27 of the cantilever beam portion 28. This cantilever portion spans the distance between the supported ends 29 and 30, which are embedded in the ground. The end portions 29 and 30 are also provided with the footing panels 31 and 32 (refer to Figure 4) to give the necessary support of the device upon the ground. It will be noted that these footing panels 31 and 32 are disposed above the center of gravity of the entire beam assembly. Not only does this arrangement tend to orient the beam in the desired attitude, but permits the device to be embedded in the earth with a minimum amount of excavation. The broadest portion of the unit (at the footing panels 31 and 32) is relatively near to the surface.

Referring to Figure 4, it will be noted that the surface of the road 10 is generally co-planar with the top surface 16 of the rails 15. The installation of one of these units is preceded by the preparation of a pit 33 of sufficient depth as to provide a clearance space under the lower surfaces 34 of the transverse beams. The purpose of this clearance area is to permit refuse and earth to be periodically raked away so that it will not build up and eventually present a solid surface across the space between the rail members 15. The pit 33 should be extended far enough on at least one side of the road to permit a man to operate a rake or similar tool for this purpose. The fence itself should of course terminate fairly close to the ends of the rails 15 to prevent the animals from walking around the unit. The last fence post can be placed in the pit itself, if so desired. It is also possible to offset the cattle guard sufficiently from the fence so that the pit is actually disposed to one side of the fence posts. The construction of the pit should reflect the particular angle of retention characteristic of the soil in which the device is placed. If the angle at the sides of the pit are too steep, the pit will gradually tend to fill. If the angle is too shallow, the sides will retain earth and refuse, and may build up to the point where portions of the device accumulate fill between the rails of the grill.

Referring to Figures 7, 8, and 9, a modified form of the present invention is shown in which the cross bolts do not need to be used. It is preferable that this construction be used with the same type of supporting footing-beam units as shown in Figure 6. In this modification of the invention, a series of parallel rails 35 is laid in spaced relationship across a group of supporting beams similar to that indicated at 36. The rails 35 are maintained in spaced relationship by the action of the end members as indicated at 37. The end members 37 are formed on their underside in a serrated pattern, with each notch 37a conforming with the trapezoidal cross section of the beams 35. When the end member 37 is placed in position on top of the rails 35, the proper spacing will be firmly established. The top surface 38 of the end members 37 is narrowed (as is the case in the beams 15 and 35 to a point which will not provide an adequate foothold for the animals). The arrangement shown in Figures 7, 8, and 9 is installed with the upper surfaces of the rails 35 at approximately the same plane with the roadway with which it is associated. The end members 37 will then run parallel to the roadway, and will be secured in position against end movement not only by their own weight, but also by the presence of the earth packed around their ends. Directly underneath the central area of these end members there will be the opening provided by the clearance pit as indicated at 33 in Figure 4.

Minor variations in the casting forms of the rails 15 and the footing-beam units will suffice to provide a great variety of lengths and widths for the entire unit. The actual assembly of the device may be performed in either case with a very minimum of tools and skill, and no preliminary or "factory" assembly need be performed in order to obtain this advantage.

The particular embodiments of the present invention which have been illustrated and discussed herein are for illustrative purposes only and are not to be considered as a limitation upon the scope of the appended claim. In this claim, it is my intention to claim the entire invention disclosed herein except as I am limited by the prior art.

I claim:

A cattle guard for preventing the passage of cattle along a roadway, comprising: a plurality of rails formed of cast material, said rails having aligned abutments integral therewith at opposite sides thereof provided with narrowed top surfaces displaced from the plane of the top surfaces of said rails, and having a transverse hole through said abutments; tie bolt means adapted to traverse said holes and secure said rails together; and supporting beams for said rails, each including laterally-extended footing panels at the ends thereof adjacent the upper surface of said beams, said footing panels being substantially less in thickness than the depth dimension of said beams at said ends.

References Cited in the file of this patent

UNITED STATES PATENTS

| | | |
|---|---|---|
| 437,757 | Hall | Oct. 7, 1890 |
| 446,228 | Hall | Feb. 10, 1891 |
| 793,812 | Armstrong et al. | July 4, 1905 |
| 1,498,596 | Weedon et al. | June 24, 1924 |